United States Patent [19]
Warmuth

[11] Patent Number: 4,650,166
[45] Date of Patent: Mar. 17, 1987

[54] TWO PIECE PISTON FOR AIRSPRINGS
[75] Inventor: Ivan J. Warmuth, Akron, Ohio
[73] Assignee: The Goodyear Tire & Rubber Company, Akron, Ohio
[21] Appl. No.: 681,533
[22] Filed: Dec. 14, 1984
[51] Int. Cl.⁴ .......................... F16F 9/04; B23P 11/02; F16B 4/00
[52] U.S. Cl. .................... 267/64.27; 29/447; 267/64.24; 403/273
[58] Field of Search ................... 267/64.24, 64.27, 120, 267/121, 35, 113, 124, 64.23, 64.25; 92/212, 216, 219, 222, 255; 29/447; 280/683, 682, 687; 264/230; 403/273, DIG. 2

[56] References Cited
U.S. PATENT DOCUMENTS

| | | | |
|---|---|---|---|
| 1,101,084 | 6/1914 | McCarty | 29/447 |
| 1,981,334 | 11/1934 | Schmalz | 29/447 |
| 2,017,419 | 10/1935 | Mercier | 267/35 |
| 3,013,813 | 12/1961 | Kozicki | 267/64.24 X |
| 3,078,085 | 2/1963 | Bank | 267/64.24 |
| 3,081,075 | 3/1963 | Selman | 267/64.24 |
| 3,956,550 | 5/1976 | Sutch | 264/230 X |
| 4,170,926 | 10/1979 | Emmett | 92/212 |
| 4,489,474 | 12/1984 | Brown et al. | 267/64.24 X |

FOREIGN PATENT DOCUMENTS 1161423  8/1958  France .......................... 267/64.27

Primary Examiner—Duane A. Reger
Assistant Examiner—Robert J. Oberleitner
Attorney, Agent, or Firm—R. D. Thompson

[57] ABSTRACT

A composite piston 40 having a tapered outer sleeve 42 with a separately formed end plug 48 securely fitted into the larger diameter end of the sleeve for use in a rolling lobe airspring 20. Also a method of manufacturing the airspring 20 with a composite piston 40 in which the piston outer sleeve 42 is formed in a mold cavity using a solid inner core. The plug 48 is separately formed and then assembled into the composite piston for a rolling lobe airspring.

8 Claims, 7 Drawing Figures

TWO PIECE PISTON FOR AIRSPRINGS

BACKGROUND OF THE INVENTION

This invention relates to airsprings, particularly to an improved piston for use on rolling lobe airsprings utilizing a flexible member which forms a rolling meniscus or lobe on the exterior of the piston.

A wide range of specific load deflection requirements can be met by tailoring the piston contour. The tailored contour of the piston allows for a change in cross-sectional area over the axial run or stroke of the piston thus changing the effective area over which the air pressure acts. This changes the spring rate of the rolling lobe airspring over its working stroke range. The ability to contour the piston of a rolling lobe spring eliminates the need for external air reservoirs which are used with other types of airsprings to achieve low spring rates and natural frequencies.

Spring rate is directly proportional to the square of the effective area. Effective area is defined by the equation $$A_e = F_s/P_g$$

where
- $A_e$ = effective area [m²]
- $F_s$ = spring force in kN(10³N)
- $P_g$ = gauge pressure, in kPa(10³N/m²).

Effective area can be approximated for a rolling lobe airspring by the equation:

$$A_e = [\pi(D+d)^2(0.9)]/16$$

where
- D = the flexible member working diameter and
- d = Piston diameter.

A decrease in the effective area can be achieved by either decreasing the flexible member diameter or decreasing the piston diameter.

Contouring the piston of a rolling lobe spring is a means by which the designer finally shapes the total load/stroke curve. A positive taper hereinafter shall mean an increasing diameter toward the bottom of the piston. A positive taper produces a higher spring rate. A negative taper or back taper piston, where the effective area diminishes with stroke, produces the lowest spring rate.

There are practical limits to maximum and minimum piston diameters which relate to the flexible members diameter and its ability to form a meniscus as it rolls downward during the stroke of the piston. There are also limits to the angle of back-taper which involve the ability of a given flexible member to follow an extreme contour.

Most pistons are made by metal casting techniques or in particular applications by molding synthetic plastic resins to the desired shape. When extreme negative or positive tapers are employed in the piston design, the problem of manufacturing the piston in one piece becomes significant. When casting or injecting a piston, a split outer mold is typically used to form the outer periphery of the airspring piston and a core is positioned inside of the mold while the casting or injection is being accomplished for the purpose of controlling the wall thickness and interior dimensioning of the piston. After completion of the forming step, the core must be removed. The pistons with which this invention is concerned are hollow or cup-form pistons which have a larger diameter end and a smaller diameter end. The larger diameter end is always closed in this configuration. The smaller diameter end may be open or closed as desired.

Significant problems arise in the manufacturing of such piston configurations. The core may not be solid since after the casting or injection is completed the core cannot be removed by axially withdrawing it from the interior of the piston. This is due to the fact that the open end of the one piece piston design is smaller than the upper end, thus, a solid core cannot be axially removed without fracturing the wall.

Since the solid core is unusable in this kind of a piston several production approaches have been employed with resulting high cost and unsatisfactory rates of production of the piston. One method is to use a sand core which is preformed prior to the casting or molding operation and subsequent to the forming of the piston the sand core is destroyed and removed from the interior of the piston. This method is expensive and labor intensive since the disposable sand core is expensive and the removal of it takes labor time. A second approach is the use of a collapsible inner core which is formed in segments which slide or pantograph over each other to form a narrower core which may be withdrawn through the smaller diameter end of the piston subsequent to the forming operation. Both of these molding approaches have been found to be very unsatisfactory from a production efficiency and cost standpoint. The method of this invention is directed to the production of a two-piece piston to replace a single piece piston when the open end of the piston is of significantly smaller diameter than the other end.

An object of the invention is to provide a multiple piece piston which can be efficiently manufactured. It is a further object of the invention to provide a multiple piece piston which has significantly lighter weight than single piece piston of similar configuration. Yet another object of the invention is to provide a method of manufacturing an airspring piston which reduces the complexity and cost of the molds required for casting or injecting the piston body.

BRIEF DESCRIPTION OF THE INVENTION

An aspect of the invention is a two-piece, composite piston for an airspring comprising: a tapered outer sleeve having a larger diameter end and a smaller diameter end; an inner plug having a cross-section substantially complementary to the cross-section of the larger diameter end of the sleeve; said plug being fixedly positioned within said sleeve adjacent said larger diameter end.

Another aspect of the invention is a rolling lobe airspring comprising: a composite, two-piece piston; an upper retainer; a flexible air impervious membrane attached as a first end to said upper retainer and attached at a second end to said composite piston to form a working cavity therebetween, said piston having a tapered outer sleeve with a larger diameter and a small diameter end and an inner plug fixedly positioned within said larger diameter end of said sleeve.

Yet another aspect of the invention is a method of manufacturing a hollow composite airspring piston having a smaller diameter open end and a larger diameter closed end comprising: forming a tapered annular sleeve having a larger diameter end and a smaller diameter end: forming a cylindrical plug having an outer diameter substantially equal to the inside diameter of the larger diameter end of said sleeve: positioning said plug within the larger diameter sleeve; joining said plug and sleeve to form a composite airspring piston.

DETAILED DESCRIPTION OF THE INVENTION

The following specific embodiments of the invention are for illustrative purposes only and should not be taken as limiting the scope of the invention. Orientation terms relating to airsprings and pistons will, unless otherwise indicated, relate to FIGS. 1, 2 and 3.

Figure 1:
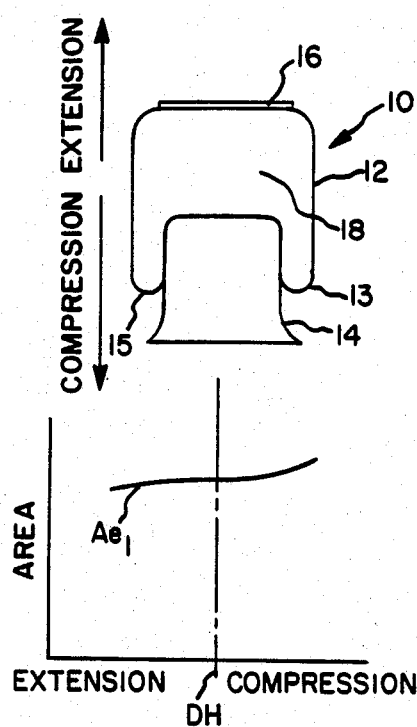
FIG. 1 illustrates a rolling lobe airspring having a cylindrical piston with effective area curve shown over its stroke.
Figure 2:
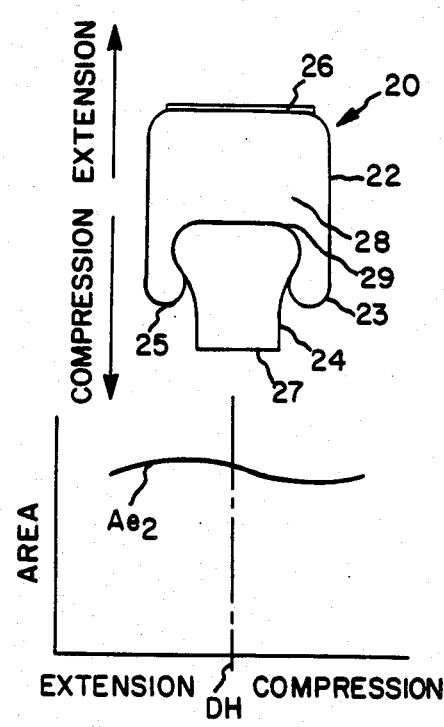
FIG. 2 shows a rolling lobe airspring having a negative taper with curves showing effective area for the negative taper piston.
Figure 3:
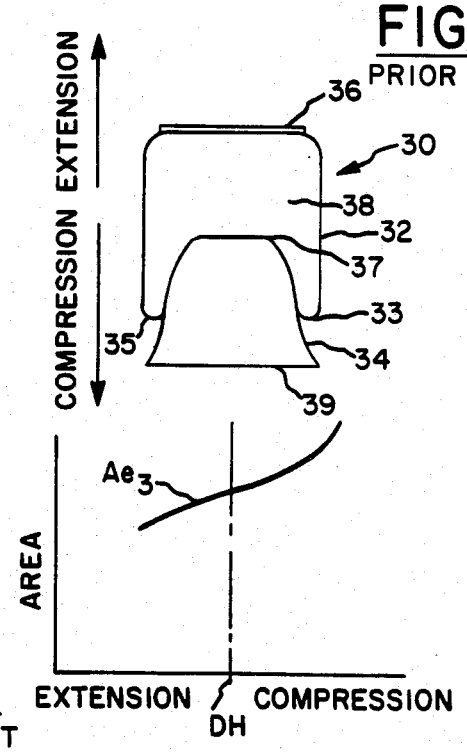
FIG. 3 is a rolling lobe airspring having a positive taper piston with corresponding effective area curve.

FIGS. 1, 2 and 3 illustrate airsprings 10,20,30 having conventional air impervious flexible members 12,22,32 sealingly attached at one end to airspring pistons 14,24,34. The opposite ends of the flexible members 12,22,32 are attached to an upper retainer 16,26,36 to form a working cavity 18,28,38 within the confines of the flexible member. Each of the three airsprings 10,20,30 have different spring rate characteristics. The flexible members 12,22,32 form circumferential rolling lobes 13,23,33 around the respective pistons 14,24,34 which move downward on the exterior of the piston during compression of the airspring. The axially extreme portion of rolling lobes 13,23,33 assume the form of a skewed meniscus 15,25,35 when viewed in axial cross section. The effective area is approximated as the area of the imaginary circle traced by the meniscus 15,25,35. Since the ability of the airspring to carry a load is dependent upon its effective area, Ae, the simplified curves for effective area $Ae_1, Ae_2, Ae_3$ are shown below each airspring 10,20,30. Curve $Ae_1$ illustrates that the constant cross sectional area of the piston 14 yields an effective area relationship which is relatively constant over the stroke of the airspring. The centerpoint of the stroke is designated as the design height of the airspring (DH) on the curve. The compression portion of the stroke is understood to be below the design height (DH) of the springs of FIGS. 1, 2 and 3.

FIG. 2 shows an airspring having all basic components similar to FIG. 1 with the exception of the piston 24 which has a severe negative taper to the side of the piston such that the diameter of the piston decreases as the meniscus 25 of the rolling lobe 23 moves axially downward on the piston 24. The effective area curve $Ae_2$ is non-linear due to the changes in diameter of the piston.

In FIG. 3, all components are similar to FIGS. 1 and 2 with the exception of the positive taper piston 34 which exhibits diameter which increases steadily toward the bottom of the piston. In order to increase the volume of the working cavity on the interior of the airspring the smaller diameter end 37 of piston 34 may optionally be open to the interior of the airspring. It is to be appreciated that the piston 14,24,34 must be mounted to a first portion of the apparatus in which the airspring 10,20,30 is operating and the upper retainer 16,26,36 is mounted to the remaining portions of the apparatus. The function of the airspring may be to isolate or activate the first portion relative to the remaining portions of the apparatus. In the airspring 30 of FIG. 3, the positive taper piston 34 may have a closed large diameter end 39 which presents a severe problem when molding a hollow piston body. As can be seen, the diameter of the smaller end 37 is less than the larger end 39 which precludes the withdrawal of a solid core from the interior of the formed piston once the molding or casting operation is complete.

The negative taper piston 24 of FIG. 2 presents the converse problem which is solved by the multi-piece, composite piston of this invention. The large diameter end portion 29 of the piston 24 is closed and the lower smaller diameter portion 27 may be closed or open. This configuration presents a similar problem in the casting and molding as the FIG. 3 positive taper piston. Both piston 24 and 34 represent general configurations which have been heretofore conventionally fabricated as single pieces. The multi-piece piston configuration of this invention may be utilized to produce strong, lightweight and low cost pistons for these positive and negative taper pistons.

Figure 4:
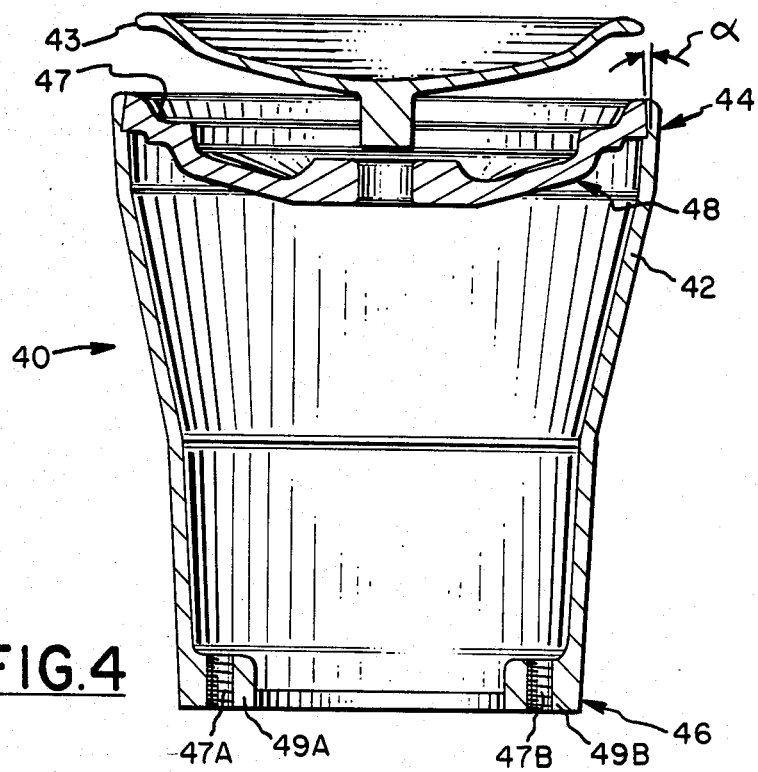
FIG. 4 is a cross section of a two piece airspring piston of this invention having a negative taper.

FIG. 4 illustrates, in detail, a negative taper rolling lobe piston having the general characteristics attributed to piston 24 of FIG. 2 but made according to this invention. Composite piston 40 is composed of two structural elements. The first is the tapered sleeve 42 which is open at both ends. Sleeve 42 has a large diameter end 44 and a smaller diameter end 46. The second structural portion of the composite piston 40 is a plug 48 which is formed separately from tapered sleeve 42 and subsequently securely fastened within the sleeve 42, adjacent the large diameter end 44. The outer circumference of the plug 48 is exactly complimentary to the inner surface of the large diameter end 44.

The plug may take any suitable configuration as required by the fitment criteria of the airspring in which the composite piston 40 is to be utilized. In the embodiment shown, a lower retainer 43 is fastened through the plug 48. A flexible membrane with a molded bead (not shown) is positioned between the plug shoulder 47 and the lower retainer 43 to form an airtight seal between the lower retainer and the bead. Thus, the piston 40 and particularly the interface between plug 48 and sleeve 42 need not be airtight in this embodiment. It serves as a support and attachment member of the airspring. In other configurations it may be desirable to make the piston airtight if it is directly subjected to the internal working pressure of the airspring.

The plug 48 must be secured within the tapered sleeve 42 by suitable means. Techniques particularly suited for the purpose of joining the sleeve and plug include heliarc welding, friction welding, sonic welding, press-fitting, shrink-fitting, thermal expansion fit, or through the use of mechanical, chemical or adhesive fastening means. Selection of the appropriate means for fastening together the component parts of the composite piston is dictated by (1) the type of material utilized to form the sleeve and/or plug; (2) design requirements of the piston, (3) whether air tightness is a requirement at the junction of the parts. FIG. 4 illustrates a preferred means of permanently joining the two portions of the composite piston. A thermal expansion fitting technique is utilized in which the outer sleeve 42 is heated sufficiently to expand the diameter to allow the plug 48 to be inserted into the large diameter end 42. Subsequent to insertion, the sleeve 42 is allowed to cool thus entrapping the plug 48. The sleeve may be slightly tapered inwardly in order to prevent the plug from sliding out under stress. The taper is shown as angle α in FIG. 4. The composite piston is shown with a mounting bosses 49A,49B which provide a reinforced portion for threaded holes 47A,47B for the insertion of a stud or other suitable fastening means for attachment of the piston to the device in which the airspring is functioning.

Figure 5:
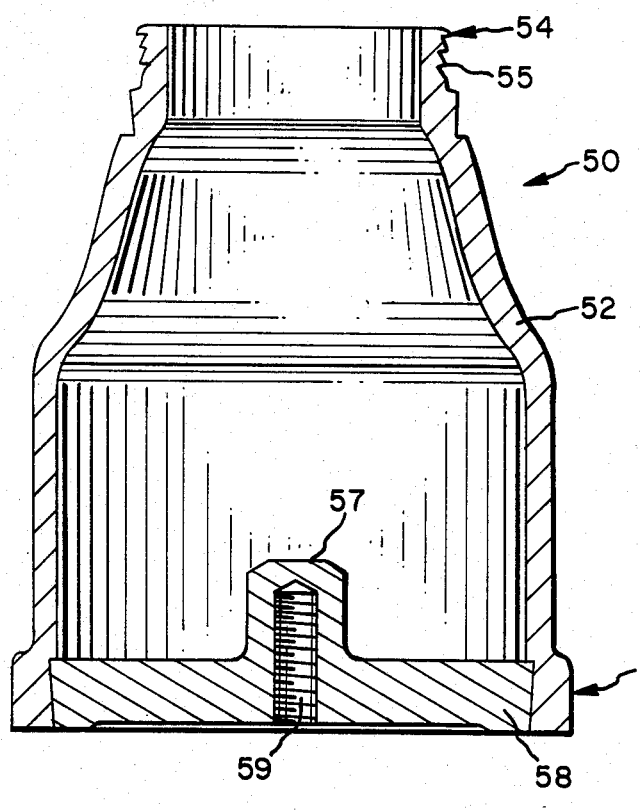
FIG. 5 is a cross section of a multiple piece airspring piston of this invention having pronounced positive taper to the side portions.

Referring now to FIG. 5, there is disclosed an alternate embodiment of a composite piston 50 which shows an extreme positive taper to the piston similar in concept to that disclosed in FIG. 3 piston 34. The piston 50 is composed of an outwardly tapering sleeve 52 and a plug 58 which fits securely and airtightly within the larger diameter end 56 of sleeve 52. The mode of attachment of the flexible airspring membrane to piston 50 is through the use of a swage ring (not shown) in the drawing, which compresses the membrane into airtight engagement with the annular serrations 55 which surround the exterior surface of the smaller diameter end 54 of the composite piston 50. The smaller diameter end 54 is open into the working cavity of the airspring which is useful to give the airspring a lower spring rate due to the higher volume working cavity at the extreme compression phase of the stroke of the airspring. A reinforcing boss 57 is molded onto the plug 58 and contains a threaded hole 59 as a means for attaching studs or other structural attachment means to the device in which the airspring is positioned. The plug 58 and outwardly tapering sleeve 52 are molded or cast separately and are joined by means for making an airtight joint between the separately molded parts by suitable techniques set forth above in FIG. 4.

Figure 6:
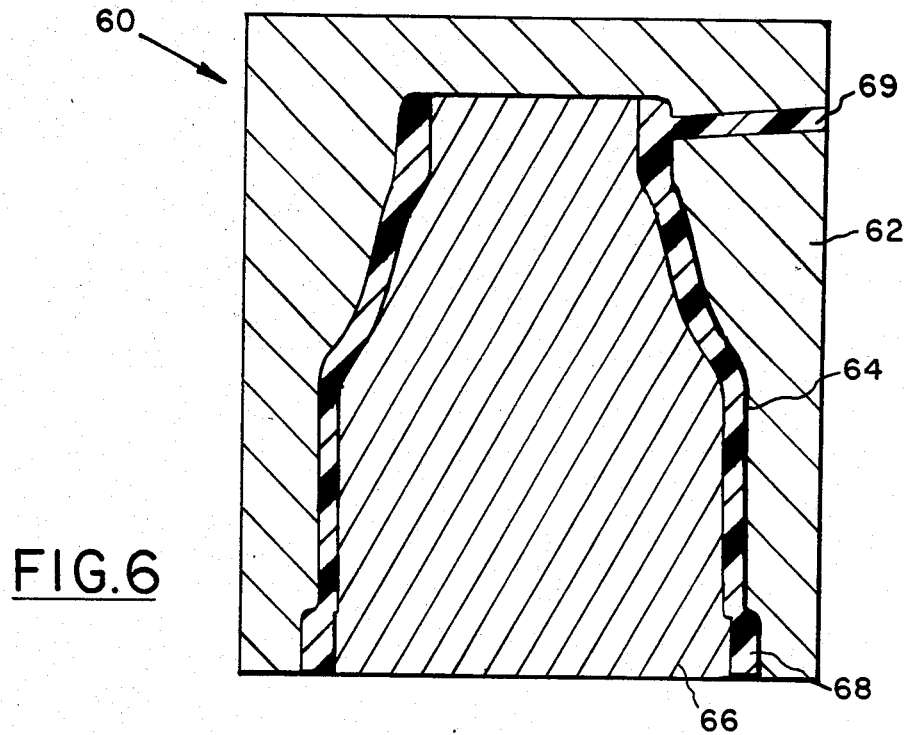
FIG. 6 is a cross section of a mold for injecting or casting the outer sleeve of the airspring piston of this invention.

FIG. 6 shows a mold 60 which includes an outer portion 62 having a cavity 64 of the desired profile to form the tapered outer sleeve. A complementary shaped solid core 66 is positioned inside the cavity 64 allowing for sufficient distance between the core 66 and the cavity 64 to form the tapered annular sleeve 68 between. The sleeve 68 may be formed by injecting a polymeric synthetic resin into the cavity through a channel 69.

Figure 7:
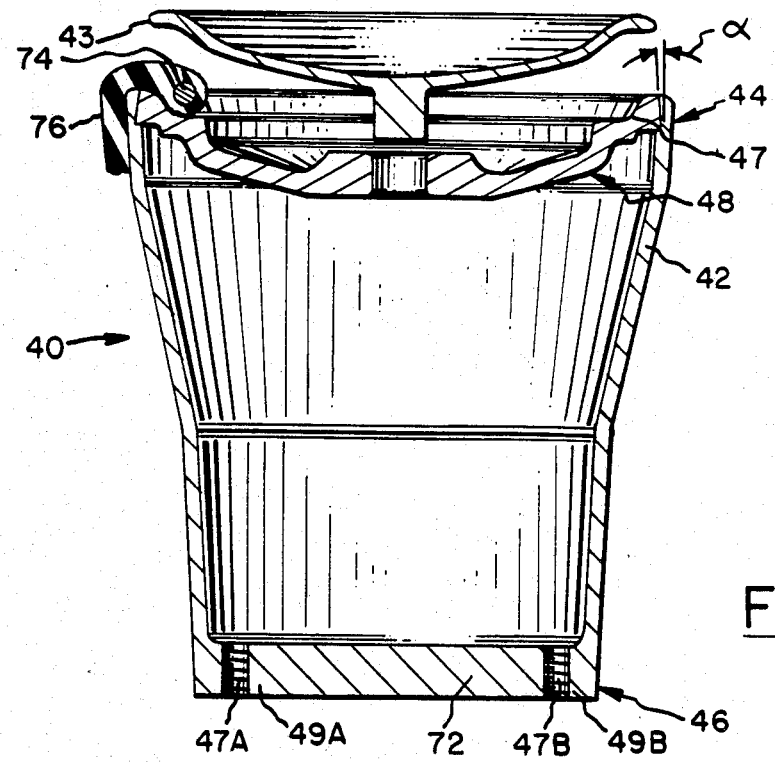
FIG. 7 is a cross sectional view of a two piece airspring piston showing a sealing bead engaged between the plug and a lower retainer.

FIG. 7 is identical in all respects to FIG. 4 with the following exceptions. The small diameter end 46 is closed by an integral end 72. The plug 48 contains a shoulder 47 adapted for positioning a sealing bead 74 which forms a part of the flexible membrane 76 of the airspring. The lower retainer 43 is axially moved downward and fixedly positioned in the plug 48 in order to establish an airtight seal between its lower surface and the sealing bead 74.

COMMERCIAL APPLICABILITY

The use of composite airspring pistons which are composed of at least two individual parts are advantageous in airspring pistons which exhibit relatively extreme degrees of positive or negative taper and in which the larger diameter end of the piston must be closed either for support or for attachment of the airspring to the device in which the airspring is working. The smaller diameter end of the airspring may be open or closed depending upon the design criteria of the application. When compared to a single piece piston of a similar exterior dimension there is substantial weight savings possible using a composite piston. The ease and efficiency of manufacturing separate pieces yields low cost assemblies. Separate pieces also allow the use of solid removable molding cores for quick removal of the component piece from the molding or casting device once the molding or casting process is complete. Thus, substantial savings in manufacturing costs can be realized and the complexity of the finished piston can be reduced through elimination of internal runners which are required in single piece configurations.

I claim:

1. A method of manufacturing a hollow composite airspring piston having a smaller diameter open end and a larger diameter closed end comprising:
    (a) forming a tapered annular sleeve having a larger diameter end and a smaller diameter end, said tapered annular sleeve being adapted to deform a flexible member of an airspring into a rolling lobe by the gradual change of the cross sectional area of the rolling lobe by movement over the tapered annular sleeve, said larger diameter end having an inward taper on an inner peripheral surface adjacent the end;
    (b) forming a cylindrical plug having an outer diameter substantially equal to the inside diameter of the larger diameter end of said sleeve, and having an outward taper on the outer diameter of said plug said outward taper being complementary to said inward taper on said sleeve;
    (c) heating said tapered annular sleeve for a time sufficient to expand said inside diameter of said tapered annular sleeve;
    (d) positioning said plug within the larger diameter end of said sleeve; joining said plug and sleeve to form a composite airspring piston; and
    (e) cooling said tapered annular sleeve to retain said plug in said sleeve and form a non-airtight joint between said plug and said sleeve.

2. A method according to claim 1 wherein said forming step uses a mold and a complementary shaped solid core to form the tapered annular sleeve therebetween.

3. A method according to claim 1 wherein said joining step is accomplished by shrink-fitting the plug inside of said sleeve.

4. A method according to claim 1 wherein said forming step comprises casting the sleeve and plug from molten metal alloy.

5. A method according to claim 1 wherein said forming step comprises injection molding a polymeric synthetic resin into a mold to form the sleeve and plug.

6. A two-piece, composite, non-airtight piston for an airspring comprising:
    a tapered outer sleeve having a larger diameter end and a smaller diameter end, said tapered outer sleeve being adapted to deform a flexible member of an airspring into a rolling lobe by the gradual change of the cross section of the rolling lobe by axial movement over the tapered outer sleeve, said larger diameter end having an inward taper on an inner peripheral surface adjacent the larger diameter end;

an inner plug having a cross-section substantially complementary to the cross-section of the larger diameter end of the sleeve, said plug being positioned within said sleeve, in non-airtight engagement with said larger diameter end and having an outward taper on the outer diameter of said plug said outward taper being complementary to said inward taper on said sleeve and said plug further including a circumferential shoulder for positioning therein a sealing bead of the flexible membrane of the airspring.

7. A piston according to claim 6 wherein said tapered outer sleeve is closed at said smaller diameter end and said composite piston is a hollow body after said plug is fixedly positioned within said sleeve.

8. A rolling lobe airspring comprising:
a composite, two-piece piston;
an upper retainer;
a flexible air impervious membrane having a first end and a second end with a sealing bead attached at the first end to said upper retainer and attached at the second end to said composite piston to form a working cavity therebetween, said piston comprising a tapered outer sleeve having a larger diameter end and a smaller diameter end said tapered outer sleeve being adapted to deform a flexible member of an airspring into a rolling lobe by the gradual change of the cross section of the rolling lobe by axial movement over the tapered outer sleeve, said larger diameter end having an inward taper on an inner peripheral surface adjacent the end and an inner plug fixedly positioned within said larger diameter end of said sleeve and having an outward taper on the outer diameter of said plug, said outward taper being complementary to said inward taper on said sleeve; and a lower retainer fixedly attached to said composite piston and forming the lower part of said working cavity, by sealably positioning said sealing bead between said piston and said lower retainer.

* * * * *